United States Patent
Suzukake

(10) Patent No.: US 11,487,344 B2
(45) Date of Patent: Nov. 1, 2022

(54) COMMUNICATION SYSTEM, COMMUNICATION DEVICE, AND POWER SAVING METHOD

(71) Applicant: RAKUTEN GROUP, INC., Tokyo (JP)

(72) Inventor: Wataru Suzukake, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 119 days.

(21) Appl. No.: 16/639,102

(22) PCT Filed: Aug. 18, 2017

(86) PCT No.: PCT/JP2017/029652
§ 371 (c)(1),
(2) Date: Feb. 13, 2020

(87) PCT Pub. No.: WO2019/035211
PCT Pub. Date: Feb. 21, 2019

(65) Prior Publication Data
US 2020/0209945 A1 Jul. 2, 2020

(51) Int. Cl.
*G06F 1/3234* (2019.01)
*G06F 1/3287* (2019.01)
*H04W 52/02* (2009.01)

(52) U.S. Cl.
CPC .......... *G06F 1/3281* (2013.01); *G06F 1/3287* (2013.01); *H04W 52/0274* (2013.01)

(58) Field of Classification Search
CPC . G06F 1/3281; G06F 1/3287; H04W 52/0274
See application file for complete search history.

(56) References Cited

U.S. PATENT DOCUMENTS

2004/0242250 A1  12/2004  Sasai et al.
2007/0265009 A1  11/2007  Hamaguchi
(Continued)

FOREIGN PATENT DOCUMENTS

JP  2007-306201 A  11/2007
JP  2012-034179 A  2/2012
(Continued)

OTHER PUBLICATIONS

Office Action dated Jun. 18, 2019, for relating JP Application No. 2019-524283 and partial translation of the Office Action.
(Continued)

*Primary Examiner* — Ji H Bae
*Assistant Examiner* — Hyun Soo Kim
(74) *Attorney, Agent, or Firm* — HEA Law PLLC

(57) ABSTRACT

Provided are a communication system, a communication device, and a power saving method, which enable a communication partner device to reliably recognize a communication unit switched to an ON state in response to reception of a predetermined signal from the communication partner device. A BLE chip transmits a BLE BD address when a BT3 chip is in an OFF state. A mobile terminal identifies a BT3 BD address associated with the BLE BD address received from a BLE chip based on stored correspondence data. A card reader switches the state of the BT3 chip to an ON state when the BLE chip receives a predetermined signal transmitted from the mobile terminal. The BT3 chip switched to an ON state starts to communicate data to be used for predetermined information processing to and from the mobile terminal.

12 Claims, 10 Drawing Sheets

(56) References Cited

U.S. PATENT DOCUMENTS

| | | | |
|---|---|---|---|
| 2008/0287160 A1 | 11/2008 | Sasai et al. | |
| 2012/0026996 A1 | 2/2012 | Yamaguchi | |
| 2012/0282860 A1 | 11/2012 | Sasai et al. | |
| 2014/0154984 A1* | 6/2014 | Perrin | H04W 52/0274 |
| | | | 455/41.2 |
| 2015/0126125 A1 | 5/2015 | Sasai et al. | |
| 2016/0127996 A1 | 5/2016 | Patil et al. | |
| 2017/0064757 A1 | 3/2017 | Sasai et al. | |
| 2018/0288660 A1* | 10/2018 | Honda | H04L 63/0846 |
| 2018/0288704 A1 | 10/2018 | Patil et al. | |
| 2018/0324717 A1* | 11/2018 | Zhou | H04W 52/0219 |
| 2019/0090195 A1* | 3/2019 | Lu | H04W 4/80 |
| 2019/0166490 A1* | 5/2019 | Lee | H04W 84/18 |

FOREIGN PATENT DOCUMENTS

| | | |
|---|---|---|
| JP | 2013-211621 A | 10/2013 |
| JP | 2015-180043 A | 10/2015 |
| JP | 2016-189566 A | 11/2016 |
| WO | 2003034660 A1 | 4/2003 |
| WO | 2016-069372 A1 | 5/2016 |

OTHER PUBLICATIONS

English translation of the International Search Report for PCT/JP2017/029652.

* cited by examiner

FIG.3

| NAME DATA | BT3 BD ADDRESS | BLE BD ADDRESS |
|---|---|---|
| reader1 | 11:11:11:11:11:11 | 11:11:11:11:11:22 |
| reader3 | 33:33:33:33:33:11 | 33:33:33:33:33:22 |

FIG.7

| NAME DATA | BT3 BD ADDRESS |
|---|---|
| reader1 | 11:11:11:11:11:11 |
| reader3 | 33:33:33:33:33:11 |

FIG.8

| BT3 BD ADDRESS | BLE BD ADDRESS |
|---|---|
| xx:xx:xx:xx:xx:11 | xx:xx:xx:xx:xx:22 |

COMMUNICATION SYSTEM, COMMUNICATION DEVICE, AND POWER SAVING METHOD

CROSS REFERENCE TO RELATED APPLICATIONS

This application is a National Stage of International Application No. PCT/JP2017/029652 filed on Aug. 18, 2017. The contents of the above document is incorporated herein by reference in its entirety.

TECHNICAL FIELD

The present invention relates to a communication system, a communication device, and a power saving method.

BACKGROUND ART

In Patent Literature 1, as a power saving technology in communication, it is described that a communication device is changed to a first mode when the communication device receives specific data in a second mode in which power consumption is suppressed more than the first mode.

In Patent Literature 2, it is described that, except for a period required for data communication, data communication means for performing the data communication is set to an inactive state.

In Patent Literature 3, it is described that a communication device has a first usage mode and a second usage mode, and in a case where the communication device receives a connection start signal, the communication device outputs a response signal in the second usage mode when a reception strength thereof is equal to or more than a predetermined value.

CITATION LIST

Patent Literature

[PTL 1] JP 2012-34179 A
[PTL 2] JP 2007-306201 A
[PTL 3] JP 2013-211621 A

SUMMARY OF INVENTION

Technical Problem

The inventor considered how to save power in communication by using a communication device including a BT3 chip supporting the BLUETOOTH (trademark) 3 (BT3) standard and a BLE chip supporting the BLUETOOTH LE (BLE) standard.

The BLE chip operates using less power than the BT3 chip. Meanwhile, the BLE chip has a smaller amount of data that can be communicated per unit time than the BT3 chip, and communication reliability is also lower. Therefore, it is desired that data communication be performed by the BT3 chip.

In view of this, in the communication device under consideration, the BLE chip receives a predetermined signal from a communication partner device when the state of the BT3 chip is an OFF state. In response to the reception of the predetermined signal, the BT3 chip switches to an ON state. The BT3 chip that has switched to an ON state then starts data communication to and from the communication partner device.

However, when data communication is started in the manner described above, the communication partner device does not recognize the BT3 chip included in the communication device together with the BLE chip receiving the predetermined signal. For example, when there are a plurality of BT3 chips around the communication partner device, the communication partner device does not recognize the BT3 chip that has switched to an ON state in response to the predetermined signal.

In the inventions described in Patent Literatures 1 to 3, one communication device is not assumed to include a BT3 chip and a BLE chip in the first place.

The matters described above apply not only to a case in which the communication device includes a BT3 chip and a BLE chip, but are also generally to a case in which the communication device includes a plurality of communication units.

The present invention has been made in view of the above circumstances. It is an object of the present invention to provide a communication system, a communication device, and a power saving method, which enable a communication partner device to reliably recognize a communication unit that switches to an ON state in response to receiving a predetermined signal from the communication partner device.

Solution to Problem

In order to solve the above-mentioned problem, according to one embodiment of the present invention, there is provided a communication system, including: a first communication device; and a second communication device, the first communication device including: a first communication unit in which first identification information is set as identification information; and a second communication unit in which second identification information different from the first identification information is set as identification information, the second communication unit being configured to operate using less power than the first communication unit, the second communication unit being configured to transmit the second identification information when a state of the first communication unit is an OFF state, the second communication device including: a storage module configured to store correspondence data indicating a correspondence between the first identification information and the second identification information; an identification module configured to identify, based on the correspondence data, the first identification information associated with the second identification information received from the second communication unit; a transmission module configured to transmit a predetermined signal to the second communication unit when the second identification information is received; and a data communication module configured to communicate data to be used for predetermined information processing to and from the first communication unit identified based on the first identification information identified by the identification module, the first communication device being configured to switch the state of the first communication unit to an ON state when the second communication unit receives the predetermined signal transmitted from the second communication device, and the first communication unit switched to an ON state being configured to start to communicate the data to be used for the predetermined information processing to and from the second communication device.

In one aspect of the present invention, the first communication unit is configured to transmit, during pairing processing with the second communication device, the first identification information and the second identification information to the second communication device, the second communication device further includes a generation module configured to generate the correspondence data based on the first identification information and the second identification information received from the first communication unit during the pairing processing with the first communication device, and the storage module is configured to store the correspondence data generated by the generation module.

Alternatively, the storage module is configured to store the correspondence data indicating a correspondence rule between the first identification information and the second identification information, and the identification module is configured to identify the first identification information associated with the second identification information received from the second communication unit in accordance with the correspondence rule indicated by the correspondence data.

Further, in one aspect of the present invention, the first communication device is configured to switch the state of the first communication unit to an ON state and to switch the state of the second communication unit to an OFF state when the second communication unit receives the predetermined signal transmitted from the second communication device.

Further, in one aspect of the present invention, the first communication unit is configured to perform wireless communication in accordance with a BLUETOOTH 3 standard, and the second communication unit is configured to perform wireless communication in accordance with a BLUETOOTH LE standard.

Further, according to one embodiment of the present invention, there is provided a communication device, including: a first communication unit in which first identification information is set as identification information; and a second communication unit in which second identification information different from the first identification information is set as identification information, the second communication unit being configured to: operate using less power than the first communication unit; and transmit the second identification information when a state of the first communication unit is an OFF state, the communication device further including an activation module configured to switch the state of the first communication unit to an ON state when the second communication unit receives a predetermined signal transmitted from a communication partner device configured to receive the second identification information, the first communication unit switched to an ON state being configured to start to communicate data to be used for predetermined information processing to and from the communication partner device.

Further, according to another embodiment of the present invention, there is provided a communication device, including: a storage module configured to store correspondence data indicating a correspondence between first identification information, which is identification information on a first communication unit included in a communication partner device, and second identification information different from the first identification information, the second identification information being identification information on a second communication unit included in the communication partner device; an identification module configured to identify, based on the correspondence data, the first identification information associated with the second identification information received from the second communication unit when a state of the first communication unit is an OFF state; a transmission module configured to transmit a predetermined signal to the second communication unit when the second identification information is received; and a data communication module configured to communicate data to be used for predetermined information processing to and from the first communication unit switched to an ON state in response to the reception of the predetermined signal by the second communication unit.

Further, according to one embodiment of the present invention, there is provided a power saving method, including the steps of: transmitting, by a second communication unit of a first communication device including a first communication unit in which first identification information is set as identification information and the second communication unit in which second identification information different from the first identification information is set as identification information, the second communication unit being configured to operate using less power than the first communication unit, the second identification information when a state of the first communication unit is an OFF state; identifying, by a second communication device configured to store correspondence data indicating a correspondence between the first identification information and the second identification information, based on the correspondence data, the first identification information associated with the second identification information received from the second communication unit; transmitting, by the second communication device, a predetermined signal to the second communication unit when the second identification information is received; switching, by the first communication device, the state of the first communication unit to an ON state when the second communication unit receives the predetermined signal transmitted from the second communication device; and starting, by the first communication unit switched to an ON state, to communicate data to be used for predetermined information processing to and from the second communication device.

BRIEF DESCRIPTION OF DRAWINGS

FIG. 3 is a table for showing an example of paired device data.

FIG. 7 is a table for showing another example of the paired device data.

FIG. 8 is a table for showing an example of correspondence rule data.

DESCRIPTION OF EMBODIMENTS

Now, an embodiment of the present invention is described with reference to the drawings.

Figure 1:
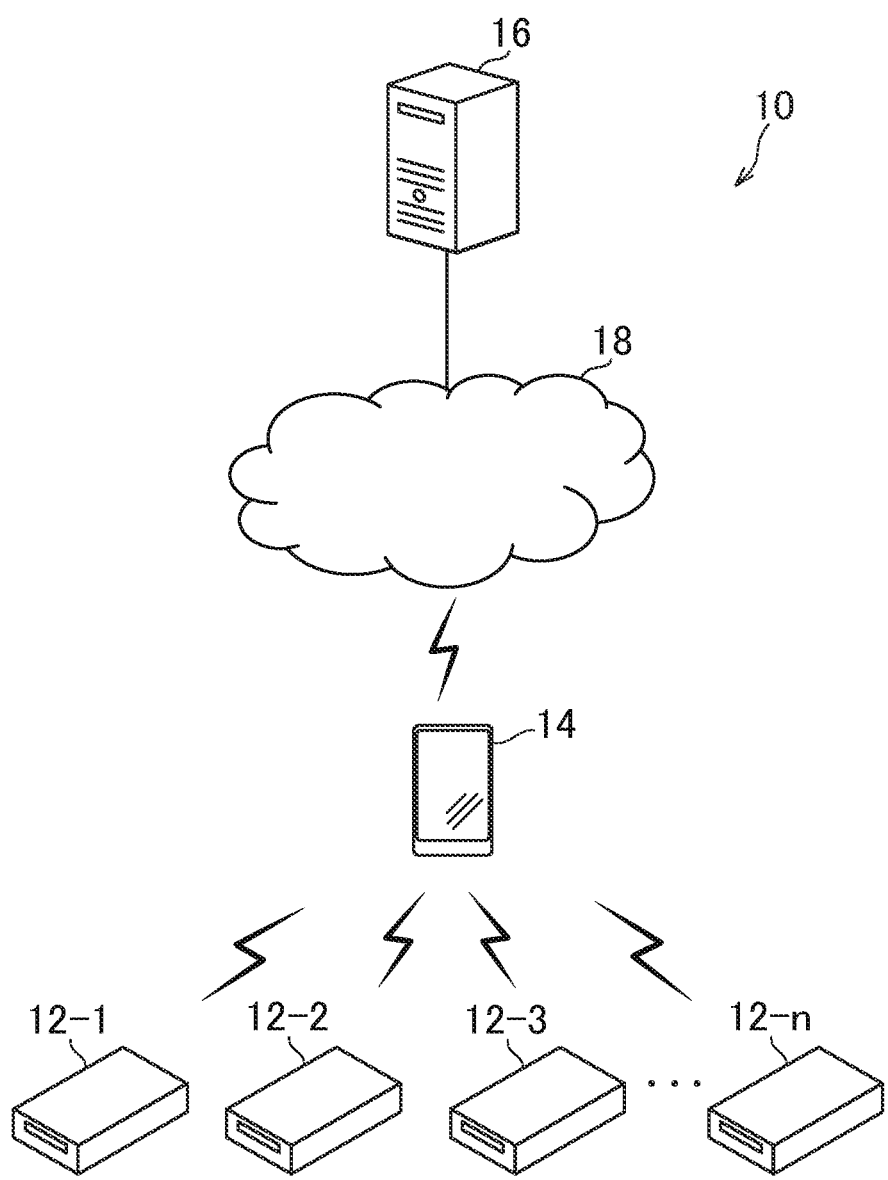
FIG. 1 is a diagram for illustrating an example of an overall configuration of a communication system according to an embodiment of the present invention.

FIG. 1 is a diagram for illustrating an example of an overall configuration of a communication system 10 according to an embodiment of the present invention. As illustrated in FIG. 1, the communication system 10 according to this embodiment includes card readers 12 (12-1 to 12-n), a mobile terminal 14, and a server 16. The mobile terminal 14 and the server 16 are connected to a computer network 18, for example, the Internet. Therefore, the mobile terminal 14 and the server 16 are allowed to communicate to and from each other via the computer network 18. The card reader 12 in this embodiment performs wireless communication in accordance with the BLUETOOTH (trademark) standard to and from the mobile terminal 14, which is a device serving as a communication partner (communication partner device). The mobile terminal 14 in this embodiment performs wireless communication in accordance with the BLUETOOTH standard to and from the card reader 12, which is a device serving as a communication partner (communication partner device).

Figure 2A:
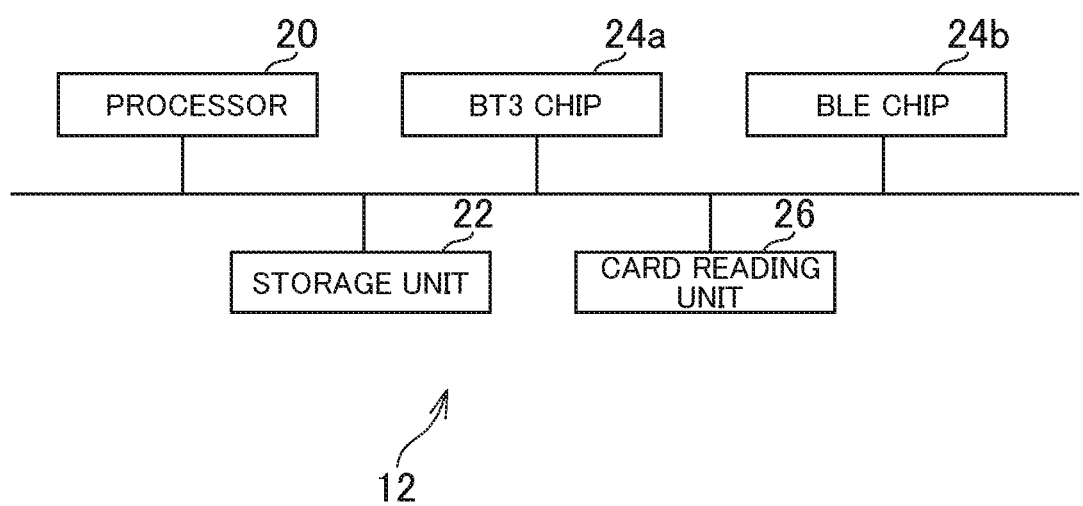
FIG. 2A is a diagram for illustrating an example of a configuration of a card reader in an embodiment of the present invention.

In this embodiment, for example, the card reader 12 is a portable device that plays a role as a communication device for communicating to and from the mobile terminal 14. As illustrated in FIG. 2A, the card reader 12 includes, for example, a processor 20, a storage unit 22, a communication unit 24 (BT3 chip 24a and BLE chip 24b), and a card reading unit 26.

The processor 20 is a central processing unit (CPU) and other program control devices, which operate in accordance with a program installed in the card reader 12, for example. The storage unit 22 is, for example, a memory element such as a read-only memory (ROM) or a random-access memory (RAM). The communication unit 24 includes a BT3 chip 24a and a BLE chip 24b. The BT3 chip 24a is a communication interface configured to perform wireless communication in accordance with the BLUETOOTH 3 standard. The BLE chip 24b is a communication interface configured to perform wireless communication in accordance with the BLUETOOTH LE standard. The card reading unit 26 is a device configured to read data recorded on various types of cards, for example, a credit card.

In this embodiment, for example, different identification information (BLUETOOTH address) is set for each of the BT3 chip 24a and the BLE chip 24b. In the following description, a BLUETOOTH address that is the identification information on the BT3 chip 24a is referred to as a "BT3 BD address", and a BLUETOOTH address that is the identification information on the BLE chip 24b is referred to as a "BLE BD address".

The BLE chip 24b operates using less power than the BT3 chip 24a. Meanwhile, the BLE chip 24b has a smaller amount of data that can be communicated per unit time than the BT3 chip 24a, and communication reliability is also lower. Therefore, it is desired that the card reader 12 and the mobile terminal 14 perform data communication by the BT3 chip 24a.

Figure 2B:
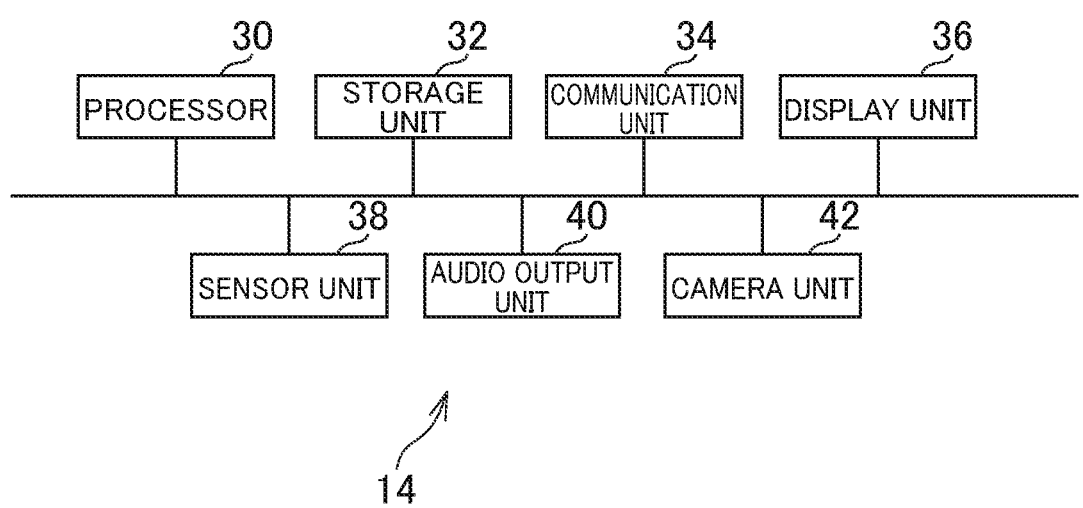
FIG. 2B is a diagram for illustrating an example of a configuration of a mobile terminal in an embodiment of the present invention.

The mobile terminal 14 is, for example, a portable device such as a smartphone or a tablet terminal. In this embodiment, the mobile terminal 14 plays a role as a communication device configured to communicate to and from the card reader 12. As described above, the mobile terminal 14 can also communicate to and from the server 16. As illustrated in FIG. 2B, the mobile terminal 14 includes, for example, a processor 30, a storage unit 32, a communication unit 34, a display unit 36, a sensor unit 38, an audio output unit 40, and a camera unit 42.

The processor 30 is a central processing unit (CPU) and other program control devices, which operate in accordance with a program installed in the mobile terminal 14, for example. The storage unit 32 is, for example, a memory element such as a ROM or a RAM. The communication unit 34 is a communication interface including an LTE communication module, a wireless LAN module, a BLUETOOTH module, and the like. The communication unit 34 may be allowed to perform wireless communication in accordance with both of the BLUETOOTH 3 standard and the BLUETOOTH LE standard. The communication unit 34 may include a chip configured to perform wireless communication in accordance with the BLUETOOTH 3 standard and a chip configured to perform wireless communication in accordance with the BLUETOOTH LE standard. The display unit 36 is, for example, a display such as a liquid crystal display or an organic EL display. The sensor unit 38 is, for example, a sensor such as a motion sensor configured to detect acceleration and angular velocity. The audio output unit 40 is, for example, headphones or a speaker. The camera unit 42 is, for example, a digital camera or other types of cameras.

In this embodiment, the server 16 is, for example, a server computer configured to execute predetermined information processing, for example, payment processing.

In this embodiment, when the communication unit 34 of the mobile terminal 14 performs pairing processing with the BT3 chip 24a of the card reader 12, paired device data associated with the card reader 12 is registered in the mobile terminal 14. In this embodiment, the paired device data is stored in, for example, the storage unit 32 of the mobile terminal 14.

FIG. 3 is a table for showing an example of the paired device data. As shown in FIG. 3, the paired device data includes at least name data indicating a name of the communication device to which pairing processing is to be performed, the BT3 BD address of that communication device, and the BLE BD address of that communication device.

For example, it is assumed that the name of the card reader 12-1 is reader 1, the name of the card reader 12-2 is reader 2, the name of the card reader 12-3 is reader 3, and the paired device data shown in FIG. 3 is stored in the mobile terminal 14. In this case, in the mobile terminal 14, the paired device data of the card reader 12-1 and the card reader 12-3 is registered, and the paired device data of the card reader 12-2 is not registered.

Figure 4A:
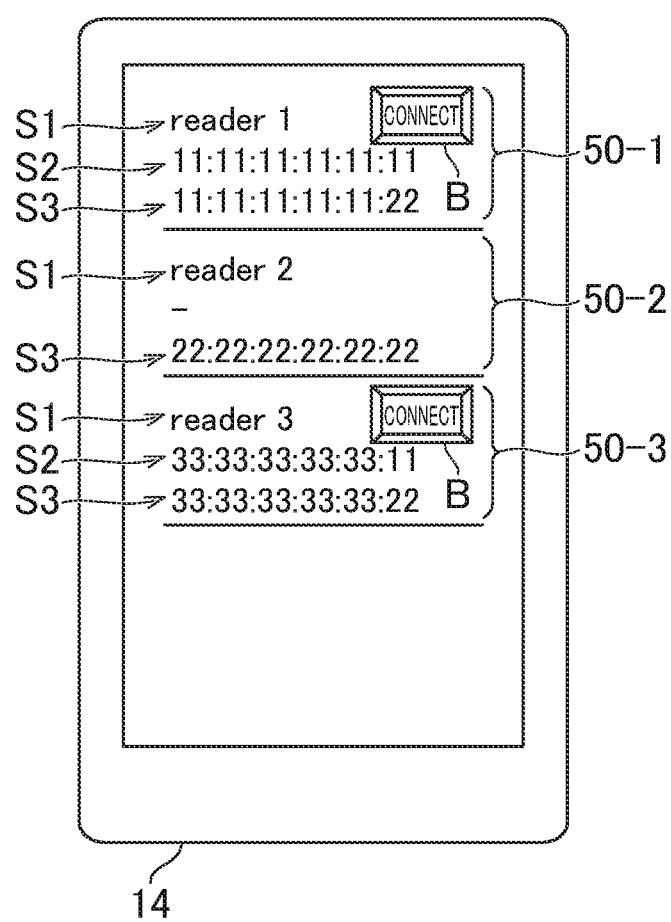
FIG. 4A is a diagram for illustrating an example of a selection screen.
Figure 4B:
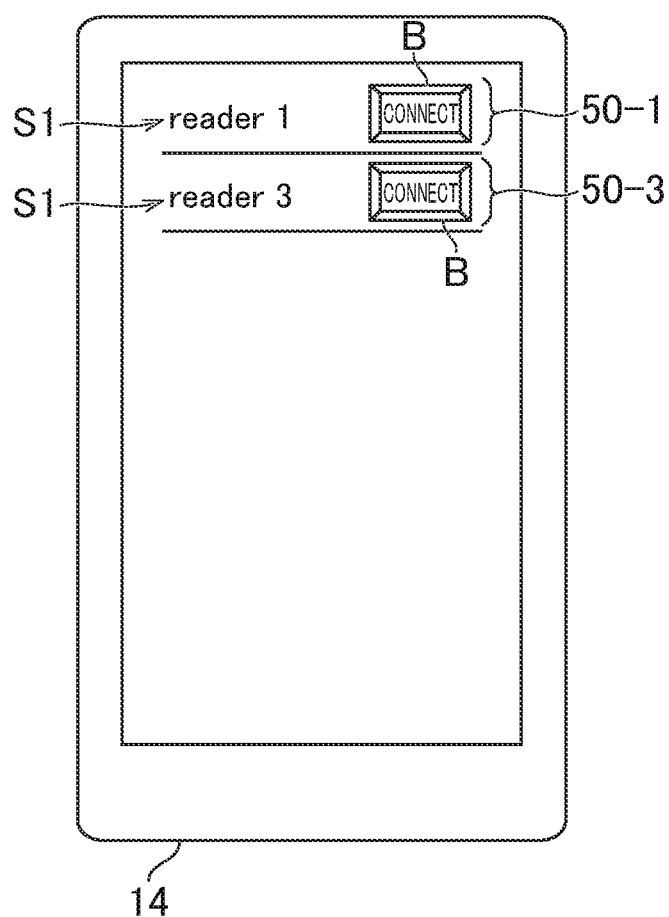
FIG. 4B is a diagram for illustrating another example of the selection screen.

FIG. 4A is a diagram for illustrating an example of a selection screen displayed on the display unit 36 of the mobile terminal 14 in this embodiment. FIG. 4B is a diagram for illustrating another example of the selection screen displayed on the display unit 36 of the mobile terminal 14 in this embodiment. The selection screen in this embodiment is not limited to the screens illustrated in FIG. 4A and FIG. 4B. On the selection screen, one piece or a plurality of pieces of candidate information 50 are arranged in association with candidates of the card reader 12 communicating data to and from the mobile terminal 14.

In this embodiment, the BLE chip 24b in a power-on state (ON state) broadcasts an advertising packet in accordance with the BLUETOOTH LE standard. The mobile terminal 14 receives the broadcast advertising packet, and displays a selection screen on which the candidate information 50 associated with the card reader 12 that transmitted the advertising packet is arranged.

For example, it is assumed that the mobile terminal 14 receives an advertising packet transmitted by each of the card reader 12-1, the card reader 12-2, and the card reader 12-3. In this case, as illustrated in FIG. 4A, the candidate information 50-1 associated with the card reader 12-1, the candidate information 50-2 associated with the card reader 12-2, and the candidate information 50-3 associated with the card reader 12-3 may be arranged on the selection screen. As illustrated in FIG. 4B, only the candidate information 50 associated with, among the card readers 12, the card readers 12 for which paired device data is registered may be arranged on the selection screen. In this case, for example, only the candidate information 50-1 associated with the card reader 12-1 and the candidate information 50-3 associated with the card reader 12-3 are arranged on the selection screen.

As illustrated in FIG. 4A, the candidate information 50 may include, for example, a character string S1 indicating the name of the card reader 12 associated with that candidate information 50. The candidate information 50 associated with the card reader 12 for which paired device data is registered may include a character string S2 indicating the BT3 BD address of the card reader 12. The candidate information 50 may include, for example, a character string S3 indicating the BLE BD address of the card reader 12 associated with the candidate information 50. As illustrated in FIG. 4B, the candidate information 50 is not always required to include the above-mentioned character string S2 and character string S3.

A connect button B may be included in the candidate information 50 associated with the card reader 12 for which paired device data is registered. As described above, the paired device data of the card reader 12-2 is not registered in the mobile terminal 14, and therefore the connect button B is not arranged in the candidate information 50-2.

When the user of the mobile terminal 14 performs an operation of selecting the connect button B included in the candidate information 50 associated with the card reader 12 to which the user is to perform data communication, a predetermined signal is transmitted to the BLE chip 24b of that card reader 12. In the following description, that signal is referred to as a "detection signal".

When the card reader 12 receives the detection signal via the BLE chip 24b, the BT3 chip 24a, which is in an OFF state, of the card reader 12 is activated. For example, the processor 20 of the card reader 12 may activate the BT3 chip 24a. As another example, the BLE chip 24b, which has received the detection signal, may activate the BT3 chip 24a. As a result, the state of the BT3 chip 24a is switched from an OFF state to an ON state. Then, the mobile terminal 14 transmits a packet, for example, a communication start request to the BT3 chip 24a, which has switched to an ON state, and data communication between the communication unit 34 of the mobile terminal 14 and the BT3 chip 24a is started. Predetermined information processing in which the card reader 12, the mobile terminal 14, and the server 16 cooperate with one another is then performed.

One usage example of this embodiment is payment processing by a credit card. In this payment processing, for example, the card reader 12 possessed by a shop reads data recorded on a credit card of a customer using the store. The read data is transmitted to the mobile terminal 14 by communication between the communication unit 34 of the mobile terminal 14 possessed by the shop and the BT3 chip 24a of the card reader 12. The mobile terminal 14 transmits the data received from the card reader 12 to the server 16, which is operated by the company issuing the credit card, and performs payment processing in cooperation with the server 16.

In this embodiment, the card reader 12, which has received the detection signal from the mobile terminal 14 via the BLE chip 24b, is required to cause the mobile terminal 14 to reliably recognize the BT3 chip 24a included in the card reader 12 and switched to an ON state in response to the reception of the detection signal. For example, the card reader 12 is required to cause the mobile terminal 14 to reliably transmit a packet, for example, a communication start request addressed to the BT3 BD address associated with the BLE BD address of the transmission destination of the detection signal.

Therefore, in this embodiment, the BT3 chip 24a, which switches to an ON state in response to the reception of the detection signal, can be identified based on correspondence data indicating a correspondence between BT3 BD address and the BLE BD address, like the above-mentioned paired device data. In this way, the card reader 12 in this embodiment can cause the mobile terminal 14 to reliably recognize the BT3 chip 24a included in the card reader 12 and switched to an ON state in response to the reception of the detection signal.

Now, a description is further given of the functions of the card reader 12 and the mobile terminal 14 in this embodiment and the processing to be executed by the communication system 10 according to this embodiment.

Figure 5:
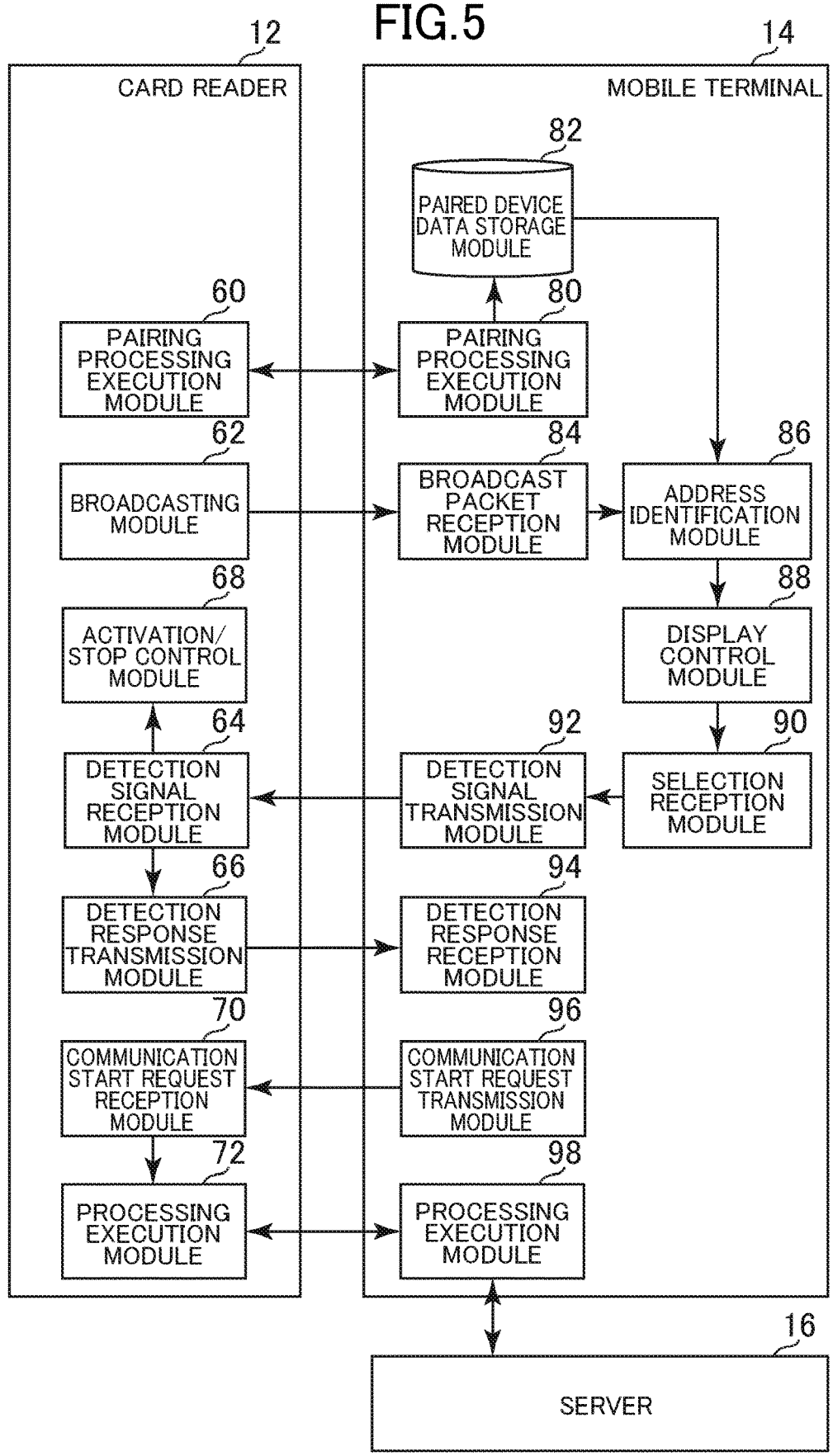
FIG. 5 is a functional block diagram for illustrating an example of functions to be implemented by the card reader and the mobile terminal in an embodiment of the present invention.

FIG. 5 is a functional block diagram for illustrating an example of the functions to be implemented by the card reader 12 and the mobile terminal 14 in this embodiment. It is not required that all of the functions illustrated in FIG. 5 be implemented by the card reader 12 and the mobile terminal 14 in this embodiment, and functions other than the functions illustrated in FIG. 5 may be implemented.

As illustrated in FIG. 5, in terms of its functions, the card reader 12 in this embodiment includes, for example, a pairing processing execution module 60, a broadcasting module 62, a detection signal reception module 64, a detection response transmission module 66, an activation/stop control module 68, a communication start request reception module 70, and a processing execution module 72.

The pairing processing execution module 60 and the communication start request reception module 70 are mainly implemented by the BT3 chip 24a. The broadcasting module 62, the detection signal reception module 64, and the detection response transmission module 66 are mainly implemented by the BLE chip 24b. The activation/stop control module 68 is mainly implemented by the processor 20 and the BLE chip 24b. The processing execution module 72 is mainly implemented by the processor 20, the BT3 chip 24a, and the card reading unit 26.

The above-mentioned functions may also be implemented by the processor 20 executing a program including commands corresponding to the functions, which is installed in the card reader 12 being a computer. The program may be supplied to the card reader 12 via, for example, a computer-readable information storage medium such as an optical disc, a magnetic disk, a magnetic tape, and a magneto-optical disk, or the Internet.

As illustrated in FIG. 5, in terms of its functions, the mobile terminal 14 in this embodiment includes, for example, a pairing processing execution module 80, a paired device data storage module 82, a broadcast packet reception module 84, an address identification module 86, a display control module 88, a selection reception module 90, a detection signal transmission module 92, a detection response reception module 94, a communication start request transmission module 96, and a processing execution module 98.

The pairing processing execution module 80, the broadcast packet reception module 84, the detection signal transmission module 92, the detection response reception module 94, and the communication start request transmission module 96 are mainly implemented by the communication unit 34. The paired device data storage module 82 is mainly implemented by the storage unit 32. The address identification module 86 is mainly implemented by the processor 30. The display control module 88 and the selection reception module 90 are mainly implemented by the processor 30 and the display unit 36. The processing execution module 98 is mainly implemented by the processor 30 and the communication unit 34.

The above-mentioned functions may also be implemented by the processor 30 executing a program including commands corresponding to the functions, which is installed in the mobile terminal 14 being a computer. The program may be supplied to the mobile terminal 14 via, for example, a computer-readable information storage medium such as an optical disc, a magnetic disk, a magnetic tape, and a magneto-optical disk, or the Internet.

In this embodiment, for example, the pairing processing execution module 60 executes pairing processing with the mobile terminal 14. The pairing processing may be performed via the BT3 chip 24a. In the pairing processing, the pairing processing execution module 60 may transmit, to the mobile terminal 14, name data indicating the name of the card reader 12 and identification information, for example, the BT3 BD address, on the BT3 chip 24a included in the card reader 12. In the pairing processing, the pairing processing execution module 60 may also transmit to the mobile terminal 14 identification information, for example, the BLE BD address, on the BLE chip 24b included in the card reader 12.

In this embodiment, the broadcasting module 62 broadcasts a packet, for example, an advertising packet when the state of the BT3 chip 24a is an OFF state, for example. In this embodiment, for example, the advertising packet includes the BLE BD address. In this embodiment, for example, broadcasting is performed via the BLE chip 24b. In this case, for example, the advertising packet may be broadcast repeatedly at a predetermined time interval.

In this embodiment, the detection signal reception module 64 receives, for example, a detection signal transmitted from the mobile terminal 14 via the BLE chip 24b. The broadcasting module 62 may end the broadcasting of the advertising packet in response to the reception of the detection signal by the detection signal reception module 64.

In this embodiment, in response to the reception of the detection signal, the detection response transmission module 66 transmits, for example, a detection response via the BLE chip 24b to the mobile terminal 14, which transmitted the detection signal.

In this embodiment, the activation/stop control module 68 controls, for example, activation and stop of the BT3 chip 24a and the BLE chip 24b. For example, the activation/stop control module 68 may activate the BT3 chip 24a in an OFF state in response to the reception of the detection signal. For example, the activation/stop control module 68 may stop the BLE chip 24b in response to the reception of the detection signal. As described above, when the BLE chip 24b receives a signal transmitted from the communication partner device (e.g., in this example, mobile terminal 14) receiving the identification information on the BT3 chip 24a, the state of the BT3 chip 24a may be switched to an ON state. Together with this switch, the state of the BLE chip 24b may be switched to an OFF state. The above-mentioned role of the activation/stop control module 68 may be performed by the processor 20 and the BLE chip 24b in cooperation with each other, or by the processor 20 or the BLE chip 24b alone.

In this embodiment, the communication start request reception module 70 receives, for example, a communication start request from the mobile terminal 14. For example, the communication start request reception module 70 may receive a communication start request from the mobile terminal 14 via the BT3 chip 24a, which has been switched to an ON state by the activation/stop control module 68.

In this embodiment, the processing execution module 72 executes, for example, predetermined information processing in cooperation with the mobile terminal 14 and the server 16. In this case, the processing execution module 72 may execute payment processing for paying with a credit card inserted into the card reader 12.

In this embodiment, for example, in response to the communication start request reception module 70 receiving the communication start request, the processing execution module 72 starts to communicate data to be used for predetermined information processing to and from the mobile terminal 14. The processing execution module 72 executes the predetermined information processing in cooperation with the mobile terminal 14.

In this embodiment, for example, the pairing processing execution module 80 executes pairing processing with the BT3 chip 24a of the card reader 12. In the pairing processing, the pairing processing execution module 80 may receive, from the card reader 12, name data indicating the name of the card reader 12 and identification information, such as the BT3 BD address, on the BT3 chip 24a included in the card reader 12. In the pairing processing, the pairing processing execution module 80 may also receive from the card reader 12 identification information, for example, the BLE BD address, on the BLE chip 24b included in the card reader 12. The pairing processing execution module 80 may also generate paired device data including a combination of the name data, the BT3 BD address, and the BLE BD address received from one card reader 12 in the pairing processing. The pairing processing execution module 80 may store the generated paired device data in the paired device data storage module 82.

In this embodiment, the paired device data storage module 82 stores, for example, the paired device data shown in FIG. 3.

In this embodiment, the broadcast packet reception module 84 receives, for example, a packet broadcast by the broadcasting module 62. The received packet may include identification information, for example, the BLE BD address, on the BLE chip 24b included in the card reader 12 transmitting the packet.

In this embodiment, the address identification module 86 identifies, for example, the identification information on the BT3 chip 24a associated with the identification information on the BLE chip 24b received from that BLE chip 24b based on the above-mentioned correspondence data. As described above, the correspondence data is, for example, data indicating a correspondence between the identification information on the BT3 chip 24a, for example, the BT3 BD address, and the identification information on the BLE chip 24b, for example, the BLE BD address. The correspondence data may be data generated based on data transmitted from the card reader 12 to the mobile terminal 14 during pairing processing between the card reader 12 and the mobile terminal 14, like paired device data.

The display control module 88 generates the selection screen illustrated in FIG. 4A and FIG. 4B based on the packet received by the broadcast packet reception module 84, and displays the selection screen on the display unit 36. The selection screen may be generated based on, for example, the paired device data stored in the paired device data storage module 82.

For example, as the character string S1 indicating the name of the card reader 12, a character string indicated by the name data included in the received packet or a character string indicated by the name data included in the paired device data, may be arranged. For example, as the character string S2 indicating the BT3 BD address of the card reader 12, a character string indicated by the BT3 BD address included in the received packet, or a character string indicated by the BT3 BD address included in the paired device data, may be arranged. Further, for example, as the character string S3 indicating the BLE BD address of the card reader 12, a character string indicated by the BLE BD address included in the received packet, or a character string indicated by the BLE BD address included in the paired device data, may be arranged.

As illustrated in FIG. 4A, a selection screen may be generated including candidate information 50 associated with each of all the card readers 12 serving as transmission sources of received packets. As shown in FIG. 4B, a selection screen may be generated including, among the card readers 12 serving as the transmission sources of received packets, only the candidate information 50 associated with the card readers having corresponding paired device data stored in the paired device data storage module 82.

As illustrated in FIG. 4A and FIG. 4B, the candidate information 50 for which the corresponding paired device data is stored in the paired device data storage module 82 may include the connect button B associated with that candidate information 50.

In this embodiment, the selection reception module 90 receives, for example, a selection of the card reader 12 performing data communication to and from the mobile terminal 14. For example, when the selection reception module 90 receives a broadcast packet from each of the plurality of card readers 12, the selection reception module 90 may receive the selection of, among the plurality of card readers 12, the card reader 12 performing data communication to and from the mobile terminal 14. In this case, any one of the plurality of card readers 12 is selected as the card reader 12 performing data communication to and from the mobile terminal 14. The selection reception module 90 may also receive, for example, a tap operation on the connect button B as a selection operation of the card reader 12 performing data communication to and from the mobile terminal 14. In this case, the card reader 12 associated with the candidate information 50 in which the connect button B is arranged is selected.

In this embodiment, the detection signal transmission module 92 transmits, for example, a detection signal to the card reader 12 identified based on the selection received by the selection reception module 90. In this case, for example, the BLE BD address of the card reader 12 may be set as the address of the destination of the detection signal.

In this embodiment, the detection response reception module 94 receives, for example, the above-mentioned detection response from the card reader 12 serving as the transmission destination of the detection signal.

In this embodiment, the communication start request transmission module 96 transmits, for example, a communication start request to the card reader 12 identified based on the selection received by the selection reception module 90. In this case, for example, the BT3 BD address of the card reader 12 may be set as the address of the destination of the communication start request. Further, for example, the communication start request transmission module 96 may transmit a communication start request after the detection signal transmission module 92 transmits the detection signal. Further, for example, the communication start request transmission module 96 may also transmit a communication start request in response to the reception of the detection response by the detection response reception module 94.

In this embodiment, the processing execution module 98 executes, for example, predetermined information processing in cooperation with the card reader 12 and the server 16. The processing execution module 98 may execute payment processing for paying with a credit card inserted into the card reader 12.

In this embodiment, for example, in response to the communication start request reception module 70 of the card reader 12 receiving the communication start request, the processing execution module 98 of the mobile terminal 14 starts to communicate data to be used for predetermined information processing to and from the card reader 12. The processing execution module 98 of the mobile terminal 14 executes the predetermined information processing in cooperation with the card reader 12.

In the above description, for example, signals such as a scan request, a connection request, and a connection end notification in the BLUETOOTH LE standard may be used as the detection signal. For example, when a scan request in the BLUETOOTH LE standard is used as the detection signal, a scan response in the BLUETOOTH LE standard may be used as the above-mentioned detection response. It is not always required to transmit the detection response by the detection response transmission module 66 and receive the detection response by the detection response reception module 94.

It is not always required to transmit the communication start request by the communication start request reception module 70. In this case, the communication of the data to be used for the predetermined information processing between the card reader 12 and the mobile terminal 14 may be started, for example, in response to the activation of the BT3 chip 24a.

Figure 6:
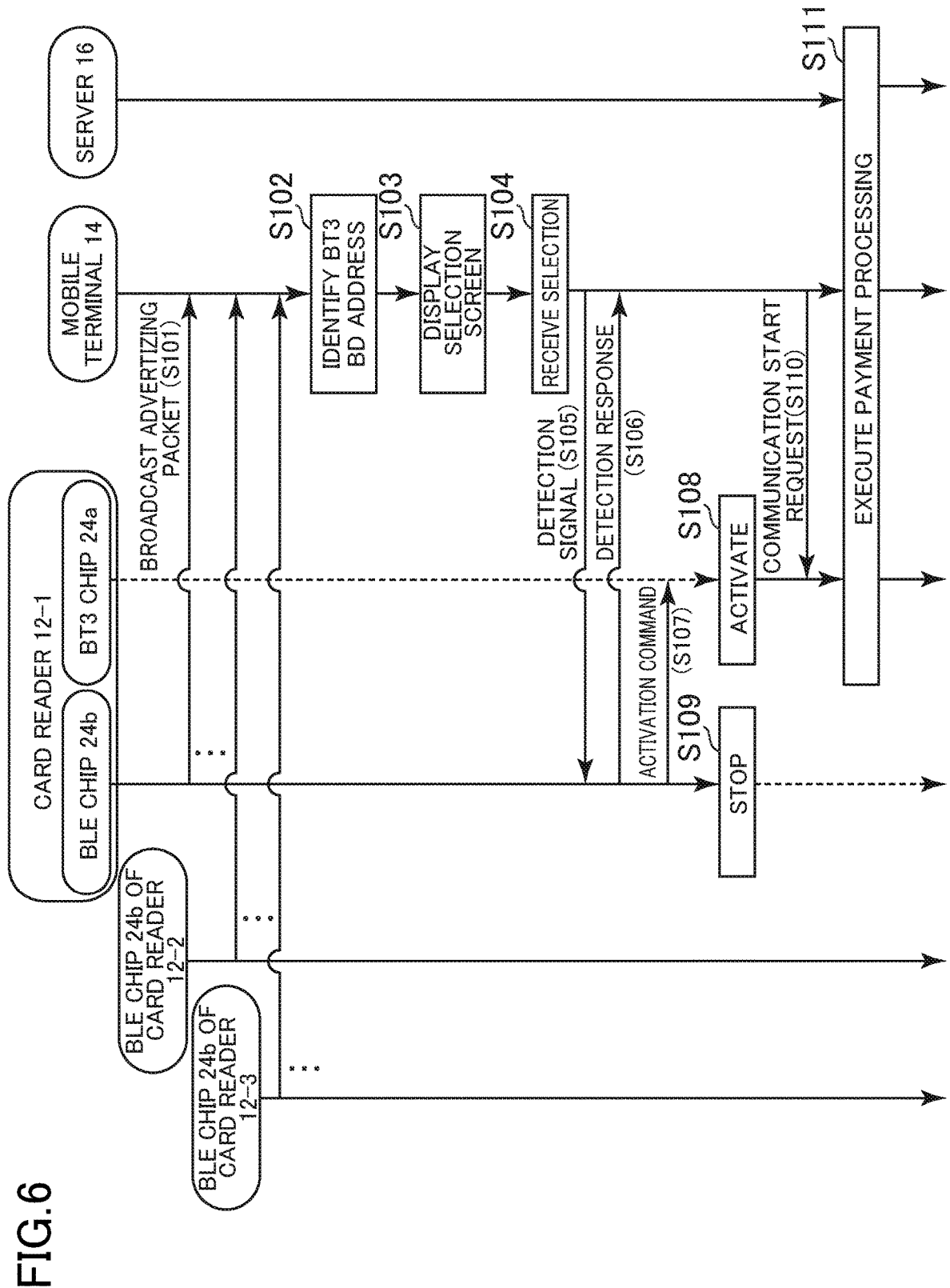
FIG. 6 is a flowchart for illustrating an example of a flow of processing to be performed in the communication system according to an embodiment of the present invention.

Now, a description is given of an example of a flow of processing to be executed by the communication system 10 according to this embodiment with reference to the flowchart illustrated in FIG. 6. In the following processing example, it is assumed that the paired device data shown in FIG. 3 is stored in the paired device data storage module 82, and data communication is started between the card reader 12-1 and the mobile terminal 14. Further, it is assumed that, at the start of the processing described in the following processing example, the state of the BT3 chip 24a included in each of the card readers 12-1, 12-2, and 12-3 is an OFF state.

In this processing example, the broadcasting module 62 of the card reader 12-1 is broadcasting an advertising packet including the BLE BD address of the card reader 12-1, the broadcasting module 62 of the card reader 12-2 is broadcasting an advertising packet including the BLE BD address of the card reader 12-2, and the broadcasting module 62 of the card reader 12-3 is broadcasting an advertising packet including the BLE BD address of the card reader 12-3. The broadcast packet reception module 84 of the mobile terminal 14 receives those advertising packets (Step S101). In this example, broadcasting of the advertising packets may be repeated as described above.

Then, the address identification module 86 identifies the BT3 BD address associated with the BLE BD address based on the BLE BD address included in the advertising packet received in the processing illustrated in Step S101 (Step S102). In the processing illustrated in Step S102, for example, the address identification module 86 may check whether or not paired device data including the BLE BD address included in the received advertising packet is stored in the paired device data storage module 82. The address identification module 86 may identify the BT3 BD address included in the paired device data confirmed as being stored, as the BT3 BD address associated with the BLE BD address included in the received advertising packet. When it is not confirmed that the paired device data including the BLE BD address included in the received advertising packet is stored in the paired device data storage module 82, the BT3 BD address may not be identified.

The display control module 88 of the mobile terminal 14, which has received the advertising packet broadcast in the processing illustrated in Step S101, generates the selection screen illustrated in FIG. 4A or FIG. 4B, and displays the generated selection screen on the display unit 36 (Step S103).

Now, it is assumed that the user taps the connect button B included in the candidate information 50-1 associated with the card reader 12-1. In this case, the selection reception module 90 of the mobile terminal 14 receives the selection of the card reader 12-1 (Step S104).

The detection signal transmission module 92 of the mobile terminal 14 then transmits a detection signal addressed to the BLE chip 24b of the card reader 12-1. The detection signal reception module 64 of the card reader 12-1 receives the detection signal (Step S105).

The detection response transmission module 66 of the card reader 12-1 then transmits a detection response addressed to the BLE chip 24b of the mobile terminal 14. The detection response reception module 94 of the mobile terminal 14 receives the detection signal (Step S106).

The activation/stop control module 68 of the card reader 12-1 then outputs to the BT3 chip 24a of the card reader 12-1 an activation command for activating the BT3 chip 24a of the card reader 12-1 (Step S107). The BT3 chip 24a of the card reader 12-1 is activated (Step S108). In this way, the state of the BT3 chip 24a of the card reader 12-1 is switched from an OFF state to an ON state.

The activation/stop control module 68 of the card reader 12-1 then stops the BLE chip 24b of the card reader 12-1 (Step S109).

The communication start request transmission module 96 of the mobile terminal 14 then transmits a communication start request addressed to the BT3 chip 24a of the card reader 12-1 identified based on the BT3 BD address identified in the processing illustrated in Step S102. The communication start request reception module 70 of the card reader 12-1 receives the communication start request (Step S110).

Then, the processing execution module 72 of the card reader 12-1, the processing execution module 98 of the mobile terminal 14, and the server 16 cooperate with one another to execute predetermined information processing, for example, payment processing (Step S111). In the information processing, data communication is performed between the card reader 12-1 and the mobile terminal 14, and between the mobile terminal 14 and the server 16.

In the processing example described above, the mobile terminal 14 may transmit a connection end notification addressed to the BLE chip 24b of the card reader 12-1 after the processing illustrated in Step S106. The activation/stop control module 68 of the card reader 12-1 may activate the BT3 chip 24a and stop the BLE chip 24b in response to the reception of the connection end notification.

Further, for example, the processing of stopping the BLE chip 24b of the card reader 12-1 illustrated in Step S109 may not be executed.

In this embodiment, the BT3 chip 24a identified based on the BT3 BD address identified based on the correspondence data in the processing illustrated in Step S102 is the same as the BT3 chip 24a switched to an ON state in the processing illustrated in Step S108. Thus, in this embodiment, the mobile terminal 14 can reliably recognize the BT3 chip 24a, which has switched to an ON state in response to receiving the detection signal from the mobile terminal 14.

In this embodiment, the BT3 chip 24a is in an OFF state until the BLE chip 24b receives the detection signal. When the BLE chip 24b receives the detection signal, the state of the BT3 chip 24a is switched to an ON state. Therefore, according to this embodiment, it is possible to save power in wireless communication. Further, in this embodiment, an operation by the user for switching the state of the BT3 chip 24a, for example, an operation of a physical button included in the card reader 12, is not required. Therefore, according to this embodiment, the time and effort imposed on the user in order to save power can be reduced.

It should be noted that the present invention is not limited to the above-mentioned embodiment.

For example, during pairing processing, the pairing processing execution module 60 may not transmit the identification information, for example, the BLE BD address, on the BLE chip 24b included in the card reader 12 to the mobile terminal 14. In that case, paired device data not including the BLE BD address shown in FIG. 7 may be generated and stored in the paired device data storage module 82.

Further, in addition to the paired device data shown in FIG. 7, the correspondence rule data shown in FIG. 8 may also be stored in the paired device storage module 82. As shown in FIG. 8, the correspondence rule data is data indicating, for example, a correspondence rule between the BT3 BD address and the BLE BD address. The correspondence rule data shown in FIG. 8 indicates that the BT3 BD address and the BLE BD address associated with each other have the same first five octets, but the last one octet is different. In the correspondence rule data shown in FIG. 8, the BLE BD address in which the last one octet is "22" is associated with the BT3 BD address in which the last one octet is "11". Therefore, for example, the BT3 BD address "11:11:11:11:11:11" of the card reader 12-1 is associated with the BLE BD address "11:11:11:11:11:22" of the card reader 12-1.

Further, for example, the BT3 BD address of a card reader 12 associated with the BLE BD address of that card reader 12 may be identified in accordance with the correspondence rule indicated by the correspondence rule data. Specifically, for example, in the processing illustrated in the Step S102, the address identification module 86 may identify the BT3 BD address associated with the BLE BD address included in the received advertising packet in accordance with the correspondence rule indicated by the correspondence rule data. In this case, the correspondence rule data acts as the correspondence data indicating the correspondence between the BT3 BD address and the BLE BD address. Thus, the correspondence data indicating the correspondence between the identification information on the BT3 chip 24a and the identification information on the BLE chip 24b is not limited to the above-mentioned paired device data.

Further, the scope of application of the present invention is not limited to communication between the card reader 12 and the mobile terminal 14. The present invention is also applicable to communication between general communication devices. Further, the scope of application of the present invention is also not limited to wireless communication. The present invention is also applicable to wired communication.

Further, the specific character strings and numerical values described above and the specific numerical values and character strings in the drawings are merely exemplary, and the present invention is not limited to those character strings and numerical values.

The invention claimed is:

1. A communication system, comprising:
a first communication device; and
a second communication device,
the first communication device including:
   a first communication unit, comprising a first wireless communication chip, in which first identification information is set; and
   a second communication unit, comprising a second wireless communication chip, in which second identification information different from the first identification information is set,
   the second communication unit being configured to operate using less power than the first communication unit,
   the second communication unit being configured to transmit the second identification information when a state of the first communication unit is an OFF state,
the second communication device being configured to:
   store correspondence data indicating a correspondence between the first identification information and the second identification information;
   identify, based on the correspondence data, the first identification information associated with the second identification information received from the second communication unit, wherein the first identification information is associated with the second identification information in the second communication device before the second identification information is received by the second communication device;
   transmit a predetermined signal to the second communication unit when the second identification information is received; and
   communicate data to be used for predetermined information processing to and from the first communication unit identified based on the first identification information,
the first communication device being configured to switch the state of the first communication unit to an ON state when the second communication unit receives the predetermined signal transmitted from the second communication device,
the first communication unit switched to an ON state being configured to start to communicate the data to be used for the predetermined information processing to and from the second communication device.

2. The communication system according to claim 1,
wherein the first communication unit is configured to transmit the first identification information and the second identification information to the second communication device, during pairing processing with the second communication device,
wherein the second communication device is further configured to generate the correspondence data based on the first identification information and the second identification information received from the first communication unit during the pairing processing with the first communication device, and
wherein the second communication device is further configured to store the generated correspondence data.

3. The communication system according to claim 1,
wherein the second communication device is further configured to:
store the correspondence data indicating a correspondence rule between the first identification information and the second identification information, and
identify the first identification information associated with the second identification information received from the second communication unit in accordance with the correspondence rule indicated by the correspondence data.

4. The communication system according to claim 1,
wherein the first communication device is configured to switch the state of the first communication unit to an ON state and to switch the state of the second communication unit to an OFF state when the second communication unit receives the predetermined signal transmitted from the second communication device.

5. The communication system according to claim 1,
wherein the first communication unit is configured to perform wireless communication in accordance with a BLUETOOTH 3 standard, and
wherein the second communication unit is configured to perform wireless communication in accordance with a BLUETOOTH LE standard.

6. The communication system according to claim 1, wherein the correspondence data includes the address of the first communication unit.

7. The communication system according to claim 1, wherein the correspondence rule is based on a mathematical relationship between the first identification information and the second identification information.

8. The communication system according to claim 1, wherein the correspondence rule is based on a comparison of the digits of the first identification information and the second identification information.

9. The communication system according to claim 1, wherein the second communication device is further configured to transmit a communication start request addressed to the first communication unit identified based on the identified first identification information, and wherein the first communication unit is configured to receive the communication start request.

10. A communication device, comprising:
a first communication unit, comprising a first wireless communication chip, in which first identification information is set; and
a second communication unit, comprising a second wireless communication chip, in which second identification information different from the first identification information is set,
the second communication unit being configured to operate using less power than the first communication unit,
the second communication unit being configured to transmit the second identification information when a state of the first communication unit is an OFF state,
the communication device further configured to switch the state of the first communication unit to an ON state when the second communication unit receives a predetermined signal transmitted from a communication partner device configured to receive the second identification information, the first communication unit switched to an ON state being configured to start to communicate data to be used for predetermined information processing to and from the communication partner device without transmitting the first identification information to the communication partner device by the second communication unit, wherein the first identification information is associated with the second identification information in the communication partner device before the second identification information is transmitted to the communication partner device.

11. A communication device configured to:

store correspondence data indicating a correspondence between first identification information and second identification information different from the first identification information, the first identification information being identification information on a first communication unit, comprising a first wireless communication chip, included in a communication partner device, and the second identification information being identification information on a second communication unit, comprising a second wireless communication chip, included in the communication partner device;

identify, based on the correspondence data, the first identification information associated with the second identification information received from the second communication unit when a state of the first communication unit is an OFF state;

transmit a predetermined signal to the second communication unit when the second identification information is received; and communicate data to be used for predetermined information processing to and from the first communication unit switched to an ON state in response to the reception of the predetermined signal by the second communication unit, wherein the first identification information is associated with the second identification information in the communication partner device before the second identification information is transmitted to the communication partner device.

12. A power saving method, comprising:

transmitting a second identification information when a state of a first communication unit, comprising a first wireless communication chip, is an OFF state, by a second communication unit, comprising a second wireless communication chip, of a first communication device including the first communication unit in which first identification information is set as identification information and the second communication unit in which the second identification information different from the first identification information is set as identification information, the second communication unit being configured to operate using less power than the first communication unit;

identifying the first identification information associated with the second identification information received from the second communication unit, by a second communication device configured to store correspondence data indicating a correspondence between the first identification information and the second identification information, based on the correspondence data, wherein the first identification information is associated with the second identification information in the second communication device before the second identification information is received by the second communication device;

transmitting a predetermined signal to the second communication unit when the second identification information is received, by the second communication device;

switching the state of the first communication unit to an ON state when the second communication unit receives the predetermined signal transmitted from the second communication device, by the first communication device; and starting to communicate data to be used for predetermined information processing to and from the second communication device, by the first communication unit switched to an ON state.

* * * * *